US009701189B2

(12) United States Patent
Lee et al.

(10) Patent No.: US 9,701,189 B2
(45) Date of Patent: Jul. 11, 2017

(54) POWER TRANSMISSION SYSTEM OF HYBRID ELECTRIC VEHICLE

(71) Applicant: Hyundai Motor Company, Seoul (KR)

(72) Inventors: Hee Ra Lee, Anyang-si (KR); SeongGon Byun, Anyang-si (KR); Hyunsup Kim, Seoul (KR); Baekyu Kim, Suwon-si (KR); Insup Kim, Anyang-si (KR); Seok Joon Kim, Yongin-si (KR); Chulmin Ahn, Busan (KR)

(73) Assignee: Hyundai Motor Company, Seoul (KR)

( * ) Notice: Subject to any disclaimer, the term of this patent is extended or adjusted under 35 U.S.C. 154(b) by 182 days.

(21) Appl. No.: 14/500,392

(22) Filed: Sep. 29, 2014

(65) Prior Publication Data

US 2015/0119178 A1    Apr. 30, 2015

(30) Foreign Application Priority Data

Oct. 29, 2013    (KR) .................. 10-2013-0129329

(51) Int. Cl.
*B60K 6/547* (2007.10)
*F16H 3/44* (2006.01)
(Continued)

(52) U.S. Cl.
CPC ............ *B60K 6/547* (2013.01); *F16H 3/44* (2013.01); *F16H 3/728* (2013.01);
(Continued)

(58) Field of Classification Search
CPC ...... F16H 3/46; F16H 3/56; F16H 2200/2038; F16H 2200/2023; F16H 2037/103; Y10S 903/91; B60K 6/547
See application file for complete search history.

(56) References Cited

U.S. PATENT DOCUMENTS 7,927,244 B2    4/2011 Iwanaka et al.
2005/0188521 A1*  9/2005 Simon ................. F16H 57/082
                                                                29/434

(Continued)

FOREIGN PATENT DOCUMENTS

JP          4007403 B1    9/2007
KR     10-0756726 B1    9/2007
KR   10-2010-0003805 A    1/2010

*Primary Examiner* — Stacey Fluhart
(74) *Attorney, Agent, or Firm* — Morgan, Lewis & Bockius LLP (57) ABSTRACT

A power transmission system of a hybrid electric vehicle may include an engine being a power source, a torque transmission device including four rotation shafts and a compound planetary gear set, the torque transmission device converting torque input from the engine, and outputting a converted torque, two supplemental power sources respectively connected to two rotation shafts among the four rotation shafts of the torque transmission device and supplying generated torque to the torque transmission device, two friction members selectively connecting two rotation shafts among the four rotation shafts of the torque transmission device to a transmission housing, an output device outputting torque transmitted from the torque transmission device, and a final reducing device decelerating torque transmitted from the output device and outputting the decelerated torque through a differential apparatus.

11 Claims, 4 Drawing Sheets

(51) Int. Cl.
   *F16H 3/72*     (2006.01)
   *F16H 37/10*    (2006.01)

(52) U.S. Cl.
   CPC .............. *F16H 2037/103* (2013.01); *F16H 2200/2023* (2013.01); *F16H 2200/2038* (2013.01); *Y10S 903/902* (2013.01)

(56) References Cited

U.S. PATENT DOCUMENTS

| | | | |
|---|---|---|---|
| 2005/0247503 A1* | 11/2005 | Imazu | B60K 6/445 |
| | | | 180/300 |
| 2006/0175102 A1* | 8/2006 | Imazu | B60K 6/365 |
| | | | 180/65.235 |
| 2008/0153660 A1* | 6/2008 | Uejima | B60K 6/40 |
| | | | 477/3 |
| 2011/0053724 A1 | 3/2011 | Phillips | |
| 2011/0111909 A1* | 5/2011 | Kim | B60K 6/365 |
| | | | 475/5 |
| 2011/0183801 A1* | 7/2011 | Ando | B60K 6/365 |
| | | | 475/5 |
| 2015/0158382 A1* | 6/2015 | Mordukhovich | F16H 3/663 |
| | | | 475/318 |

\* cited by examiner

| mode | | B1 | B2 | note |
|---|---|---|---|---|
| EV | | X | X | · operating MG2<br>· initial starting |
| HEV | P/Split | X | X | · |
| | UD | X | O | · all of engine/MG1/MG2 can be operated at UD<br>· driving performance can be secured with minimum capacity |
| | OD | O | X | · high/constant speed driving |

| mode | | CL | B1 | B2 | note |
|---|---|---|---|---|---|
| EV | | X | X | X | · operating MG2<br>· initial starting |
| HEV | P/Split | O | X | X | · |
| | UD | O | X | O | · all of engine/MG1/MG2 can be operated at UD<br>· driving performance can be secured with minimum capacity |
| | OD | O | O | X | · high/constant speed driving |

POWER TRANSMISSION SYSTEM OF HYBRID ELECTRIC VEHICLE

CROSS-REFERENCE TO RELATED APPLICATION

The present application claims priority to and the benefit of Korean Patent Application No. 10-2013-0129329 filed Oct. 29, 2013, the entire contents of which is incorporated herein for all purposes by this reference.

BACKGROUND OF THE INVENTION

Field of the Invention

The present invention relates to a power transmission system of a hybrid electric vehicle. More particularly, the present invention relates to a power transmission system of a hybrid electric vehicle that can be used as a hybrid electric vehicle of series type and a hybrid electric vehicle of parallel type by using two motor/generators.

Description of Related Art

Environmentally-friendly technique of vehicles is a very important technique on which survival of future motor industry is dependent. Vehicle makers are focusing on development of environmentally-friendly vehicles so as to meet environment and fuel consumption regulations.

Therefore, each vehicle maker is developing an electric vehicle (EV), a hybrid electric vehicle (HEV), a fuel cell electric vehicle (FCEV) and so on as future vehicles.

Since the future vehicles have various technical limitations such as weight and cost, the vehicle makers are paying attention to a hybrid electric vehicle in order to meet exhaust gas regulations and improve fuel economy and compete for commercializing the hybrid electric vehicle.

The hybrid electric vehicle is a vehicle using two or more power sources, and a gasoline engine or a diesel engine using fossil fuel and a motor/generator driven by electrical energy are used as the power sources of the hybrid electric vehicle.

The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle.

Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear sets, and a battery used as a power source of the motor/generators.

The power transmission system of the multi-mode type has different operating mechanisms depending on connections of the planetary gear sets, the motor/generators, and the torque delivery apparatus.

In addition, the power transmission system of the multi-mode type has different features such as durability, power delivery efficiency, and size depending on the connections of the planetary gear sets, the motor/generators, and the torque delivery apparatus. Therefore, designs for the connection structure of the power transmission system of a hybrid electric vehicle are also under continuous investigation to achieve robust and compact power transmission system having no power loss.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system of a hybrid electric vehicle having advantages of being used variably as series type and parallel type hybrid electric vehicle by using two motor/generators.

In addition, various aspects of the present invention are directed to providing a power transmission system of a hybrid electric vehicle having further advantages of achieving underdrive shift-speed and overdrive shift-speed at a parallel mode.

In an aspect of the present invention, a power transmission system of a hybrid electric vehicle may include an engine being a power source, a torque transmission device including four rotation shafts and a compound planetary gear set, the torque transmission device converting torque input from the engine, and outputting a converted torque, two supplemental power sources respectively connected to two rotation shafts among the four rotation shafts of the torque transmission device and supplying generated torque to the torque transmission device, two friction members selectively connecting two rotation shafts among the four rotation shafts of the torque transmission device to a transmission housing, an output device outputting torque transmitted from the torque transmission device, and a final reducing device decelerating torque transmitted from the output device and outputting the decelerated torque through a differential apparatus.

The torque transmission device is the compound planetary gear set formed by combining a single pinion planetary gear set and a double pinion planetary gear set and having a ring gear and a planet carrier in common.

The four rotation shafts of the torque transmission device may include a first rotation shaft including a first sun gear engaged with a short pinion, the first rotation shaft being connected to one of the two supplemental power sources, and selectively connected to the transmission housing, a second rotation shaft including a common planet carrier and connected to the input shaft continuously or selectively, a third rotation shaft including a common ring gear, connected to the other of the supplemental power sources, and connected to an intermediate output gear, and a fourth rotation shaft including a second sun gear engaged with a long pinion and selectively connected to the transmission housing.

A torsional damper absorbing and reducing torsional vibration is disposed on the input shaft connecting the second rotation shaft with the engine.

An engine clutch is disposed between the second rotation shaft and the input shaft.

Each of the two supplemental power sources may include a first motor/generator directly connected to the first rotation shaft, and a second motor/generator directly connected to the third rotation shaft.

The two friction members may include a first brake disposed between the first rotation shaft and the transmission housing, and a second brake disposed between the fourth rotation shaft and the transmission housing.

The output device may include an output shaft disposed in parallel with and apart from the torque transmission device, an intermediate input gear disposed on a first side portion of the output shaft and engaged with the intermediate output gear, and a final output gear disposed on a second side portion of the output shaft.

In another aspect of the present invention, a power transmission system of a hybrid electric vehicle may include an engine being a power source, a torque transmission device being a compound planetary gear set formed by combining a single pinion planetary gear set and a double pinion planetary gear set and having a ring gear and a planet carrier in common, wherein the torque transmission device may include a first rotation shaft having a first sun gear engaged with a short pinion and selectively connected to a transmission housing, a second rotation shaft having a common planet carrier and connected to an input shaft receiving torque from the engine, a third rotation shaft having a common ring gear and connected to an intermediate output gear, and a fourth rotation shaft having a second sun gear engaged with a long pinion and selectively connected to the transmission housing, a first supplemental power source including a first motor/generator directly connected to the first rotation shaft, a second supplemental power source including a second motor/generator directly connected to the third rotation shaft, a first friction member including a first brake disposed between the first rotation shaft and the transmission housing, a second friction member including a second brake disposed between the fourth rotation shaft and the transmission housing, and an output device decelerating torque transmitted from the torque transmission device and outputting the decelerated torque.

The power transmission system may further include a final reducing device finally decelerating toque transmitted from the output device and transmitting the decelerated torque to a driving wheel through a differential apparatus.

A torsional damper absorbing and reducing torsional vibration is disposed on the input shaft connecting the second rotation shaft with the engine.

An engine clutch is disposed between the second rotation shaft and the input shaft.

The output device may include an output shaft disposed in parallel with and apart from the torque transmission device, an intermediate input gear disposed on a first side portion of the output shaft and engaged with the intermediate output gear, and a final output gear disposed on a second side portion of the output shaft.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Reference numerals set forth in the Drawings include reference to the following elements as further discussed below.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings so that those skilled in the Field of the Invention to which the present invention pertains may carry out the exemplary embodiment.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

Figure 1:
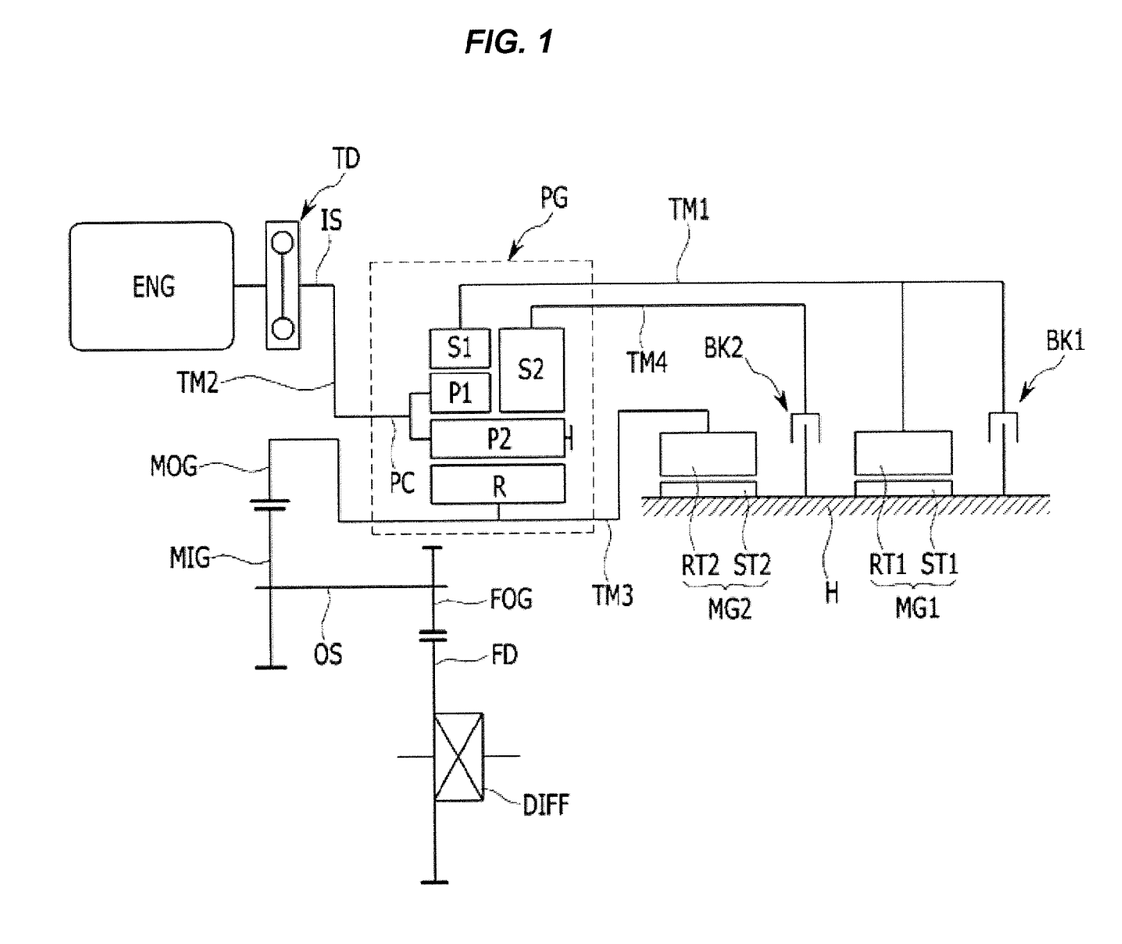
FIG. 1 is a schematic diagram of a power transmission system according to various exemplary embodiments of the present invention.

FIG. 1 is a schematic diagram of a power transmission system according to various exemplary embodiments of the present invention.

Referring to FIG. 1, a power transmission system of a hybrid electric vehicle according to the first exemplary embodiment of the present invention includes an engine ENG, a torque transmission device, supplemental power sources, friction members, an output device, and a final reducing device.

The engine ENG is a main power source, and a gasoline engine or a diesel engine using fossil fuel may be used as the engine ENG.

The torque transmission device is a compound planetary gear set PG of Ravingneaux type formed by combining a single pinion planetary gear set and a double pinion planetary gear set and having a ring gear and a planet carrier in common.

The compound planetary gear set PG has four rotation shafts TM1, TM2, TM3, and TM4 including a common ring gear R, a common planet carrier PC, and two sun gears S1 and S2.

The four rotation shafts TM1, TM2, TM3, and TM4 will be described in detail.

The first rotation shaft TM1 includes a first sun gear S1 engaged with a short pinion P1, is connected to one of the supplemental power sources, and is selectively connected to a transmission housing H.

The second rotation shaft TM2 includes a common planet carrier PC and is directly connected to an input shaft IS.

The third rotation shaft TM3 includes a common ring gear R, is connected to the other of the supplemental power sources, and is connected to an intermediate output gear MOG.

The fourth rotation shaft TM4 includes a second sun gear S2 engaged with a long pinion P2 and is selectively connected to the transmission housing H.

A torsional damper TD is disposed on the input shaft IS connecting the second rotation shaft TM2 and the engine ENG and is adapted to absorb torsional vibration.

The supplemental power source includes first and second motor/generators MG1 and MG2.

The first motor/generator MG1 is operated as a motor and a generator, and includes a first rotor RT1 and a first stator ST1.

The first rotor RT1 is connected to the first rotation shaft TM1 and the first stator ST1 is fixed to the transmission housing H so as to drive the first rotation shaft TM1 or to be operated as a generator generating electricity by torque of the first rotation shaft TM1.

The second motor/generator MG2 is operated as a motor and a generator, and includes a second rotor RT2 and a second stator ST2.

The second rotor RT2 is connected to the third rotation shaft TM3 and the second stator ST2 is fixed to the transmission housing H so as to drive the third rotation shaft TM3 or to be operated as a generator generating electricity by torque of the third rotation shaft TM3.

The friction member includes a first brake BK1 and a second brake BK2.

The first brake BK1 is interposed between the first rotation shaft TM1 and the transmission housing H and causes the first rotation shaft TM1 to be operated as a fixed element selectively.

The second brake BK2 is interposed between the fourth rotation shaft TM4 and the transmission housing H and causes the fourth rotation shaft TM4 to be operated as a fixed element selectively.

The first and second brakes BK1 and BK2 may be conventional multi-plate friction elements of wet type that are operated by hydraulic pressure and may be controlled by a hydraulic control system.

The output device includes an output shaft OS disposed in parallel with and apart from the torque transmission device, an intermediate input gear MIG disposed at one side portion of the output shaft OS and engaged with the intermediate output gear MOG, and a final output gear FOG disposed at the other side portion of the output shaft OS.

The final reducing device includes a differential apparatus DIFF and a final reduction gear FD. The final reduction gear FD is engaged with the final output gear FOG such that the final reducing device decelerates the torque transmitted from the output shaft OS and transmits the decelerated toque to a driving wheel through the differential apparatus DIFF.

Figure 2:
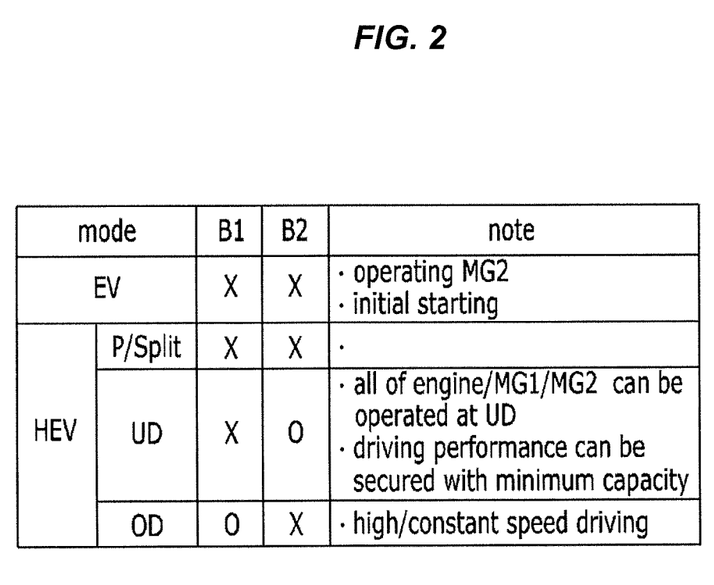
FIG. 2 is an operational chart of frictional elements at each mode applied to the power transmission system according to various exemplary embodiments of the present invention.

FIG. 2 is an operational chart of frictional elements at each mode applied to a power transmission system according to various exemplary embodiments of the present invention.

Referring to FIG. 2, neither of the first and second brakes BK1 and BK2 is operated at an electric vehicle (EV) mode.

Therefore, since the engine ENG is stopped and the vehicle is propelled by the second motor/generator MG2, high efficiency may be secured.

Neither of the first and second brakes BK1 and BK2 is operated at a power split (P/Split) hybrid mode.

At this state, the first motor/generator MG1 starts the engine ENG through the compound planetary gear set PG. After that, the first motor/generator MG1 generates electrical energy by the torque of the engine ENG and transmits the electrical energy to the second motor/generator MG2 or the battery.

According to the power split hybrid mode, excellent fuel economy may be secured at city driving of middle/low speed.

At an underdrive (UD) mode in which high power is required, the first brake BK1 is released and the second brake BK2 is operated. Therefore, the vehicle is propelled by the engine ENG, the first motor/generator MG1, and the second motor/generator MG2, thereby reducing capacities of the first and second motor generators MG1 and MG2. That is, since the engine ENG is operated, maximum demand torque of a driver can be achieved even though less torque is supplied from the first and second motor generators MG1 and MG2.

An overdrive (OD) mode is used for high speed or constant speed driving. At the OD mode, the first brake BK1 is operated and the second brake BK2 is released. At the overdrive (OD) mode, excellent fuel economy may be secured by controlling the engine ENG and the second motor/generator MG2 optimally without deterioration of efficiency due to power split.

The power transmission system according to the first exemplary embodiment of the present invention may improve mountability by using two motor/generators MG1 and MG2 and the minimum number of power transmission devices.

In addition, power delivery efficiency similar to a reducer can achieve may be secured at the EV mode, and the power split mode and the parallel mode may be selectively used considering optimum efficiency of the power split mode and the parallel mode at the HEV mode.

In addition, power delivery efficiency similar to an electric vehicle can achieve may be secured at a charge depleting (CD) region of a plug-in hybrid electric vehicle (PHEV) and the highest fuel mileage may be secured.

In addition, since the power split mode and the parallel mode are used to cause optimum driving of the engine ENG at a charge sustaining (CS) region, the system may achieve the highest fuel economy and be applied simultaneously to the PHEV and the HEV.

In addition, all of the engine ENG and the first and second motor/generators MG1 and MG2 can propel the vehicle if high power performance is necessary at uphill driving or quick acceleration, capacities of electric power components may be greatly reduced.

Figure 3:
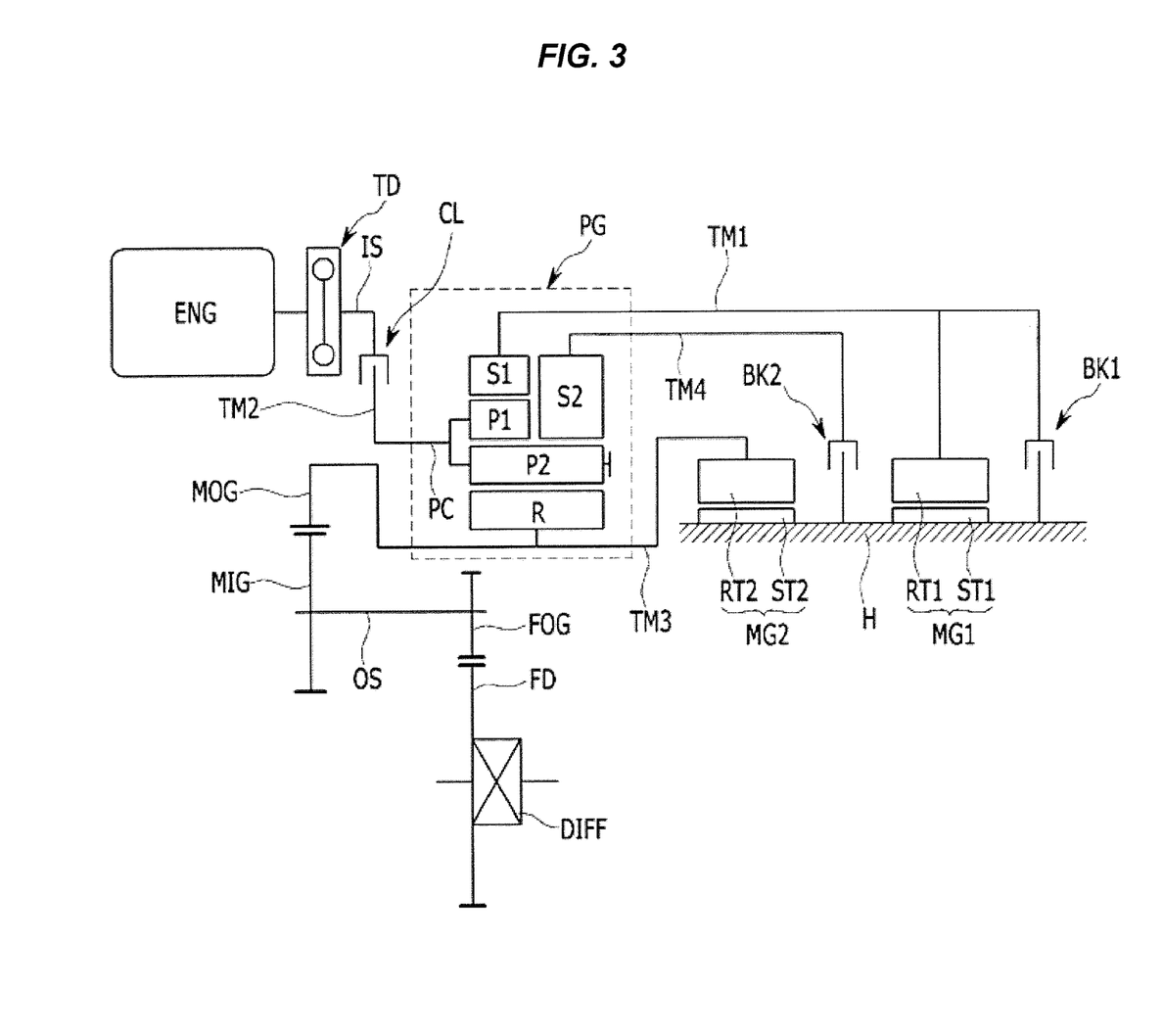
FIG. 3 is a schematic diagram of a power transmission system according to various exemplary embodiments of the present invention.

FIG. 3 is a schematic diagram of a power transmission system according to various exemplary embodiments of the present invention.

Referring to FIG. 3, an engine clutch CL is disposed between the input shaft IS and the second rotation shaft TM2 in the second exemplary embodiment. Since other constituent elements of the second exemplary embodiment are the same as those of the first exemplary embodiment, detailed description thereof will be omitted.

According to the second exemplary embodiment, driving performance may be maximized by releasing the engine clutch CL at the CD region of the EV mode.

Figure 4:
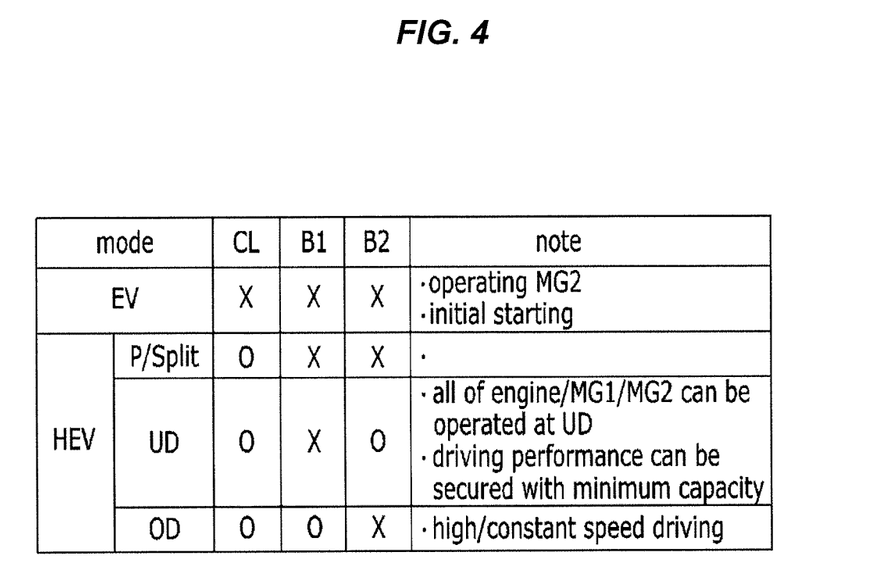
FIG. 4 is an operational chart of the frictional elements at each mode applied to the power transmission system according to various exemplary embodiments of the present invention.

In addition, as shown in FIG. 4, the engine ENG may propel the vehicle by operating the engine clutch CL at the CS region of the EV mode. In this case, initial starting of the engine ENG may be possible by torque of the first motor/generator MG1 or the second motor/generator MG2. In addition, after the engine ENG is started, the vehicle may be propelled by the torque of the engine ENG and the first and second motor/generators MG1 and MG2.

Since the vehicle is driven by the second motor/generator at the EV mode in a stopped state of the engine according to the exemplary embodiments of the present invention, unnecessary mechanical loss may be minimized and power delivery efficiency similar to that the reducer can achieve may be secured.

At the HEV mode, the vehicle runs basically according to the power split mode but runs according to the UD of the parallel mode if high power is required. Therefore, capacities of the electric power components may be greatly reduced.

In addition, since the OD of the parallel mode can be used, fuel economy may be enhanced at high speed driving or constant speed driving.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system of a hybrid electric vehicle comprising:
    an engine being a power source;
    a torque transmission device including four rotation shafts and a compound planetary gear set, the torque transmission device converting torque input from the engine, and outputting a converted torque;
    two supplemental power sources respectively connected to two rotation shafts among the four rotation shafts of the torque transmission device and supplying generated torque to the torque transmission device;
    two friction members selectively connecting two rotation shafts among the four rotation shafts of the torque transmission device to a transmission housing;
    an output device including an output shaft outputting torque transmitted from the torque transmission device; and
    a final reducing device, including a final reduction gear and a differential apparatus, decelerating torque transmitted from the output device through the final reduction gear and outputting the decelerated torque through the differential apparatus,
    wherein the torque transmission device is the compound planetary gear set formed by combining a single pinion planetary gear set and a double pinion planetary gear set and having a ring gear and a planet carrier in common, and
    wherein the four rotation shafts of the torque transmission device comprise:
        a first rotation shaft including a first sun gear engaged with a short pinion, the first rotation shaft being connected to one of the two supplemental power sources, and selectively connected to the transmission housing;
        a second rotation shaft including a common planet carrier and connected to an input shaft continuously or selectively;
        a third rotation shaft including a common ring gear, connected to the other of the supplemental power sources, and connected to an intermediate output gear; and
        a fourth rotation shaft including a second sun gear engaged with a long pinion and selectively connected to the transmission housing.

2. The power transmission system of claim 1, wherein a torsional damper absorbing and reducing torsional vibration is disposed on the input shaft connecting the second rotation shaft with the engine.

3. The power transmission system of claim 2, wherein an engine clutch is disposed between the second rotation shaft and the input shaft.

4. The power transmission system of claim 1, wherein each of the two supplemental power sources comprises:
    a first motor/generator directly connected to the first rotation shaft; and
    a second motor/generator directly connected to the third rotation shaft.

5. The power transmission system of claim 1, wherein the two friction members comprise:
    a first brake disposed between the first rotation shaft and the transmission housing; and a second brake disposed between the fourth rotation shaft and the transmission housing.

6. The power transmission system of claim 1, wherein the output device comprises:
   the output shaft disposed in parallel with and apart from the torque transmission device;
   an intermediate input gear disposed on a first side portion of the output shaft and engaged with the intermediate output gear; and
   a final output gear disposed on a second side portion of the output shaft.

7. A power transmission system of a hybrid electric vehicle comprising:
   an engine being a power source;
   a torque transmission device being a compound planetary gear set formed by combining a single pinion planetary gear set and a double pinion planetary gear set and having a ring gear and a planet carrier in common, wherein the torque transmission device includes:
      a first rotation shaft having a first sun gear engaged with a short pinion and selectively connected to a transmission housing;
      a second rotation shaft having a common planet carrier and connected to an input shaft receiving torque from the engine;
      a third rotation shaft having a common ring gear and connected to an intermediate output gear; and
      a fourth rotation shaft having a second sun gear engaged with a long pinion and selectively connected to the transmission housing;
   a first supplemental power source including a first motor/generator directly connected to the first rotation shaft;
   a second supplemental power source including a second motor/generator directly connected to the third rotation shaft;
   a first friction member including a first brake disposed between the first rotation shaft and the transmission housing;
   a second friction member including a second brake disposed between the fourth rotation shaft and the transmission housing; and
   an output device including an output shaft decelerating torque transmitted from the torque transmission device and outputting the decelerated torque.

8. The power transmission system of claim 7, further comprising a final reducing device including a final reduction gear and a differential apparatus, finally decelerating toque transmitted from the output device through the final reduction gear and transmitting the decelerated torque to the driving wheel through the differential apparatus.

9. The power transmission system of claim 7, wherein a torsional damper absorbing and reducing torsional vibration is disposed on the input shaft connecting the second rotation shaft with the engine.

10. The power transmission system of claim 7, wherein an engine clutch is disposed between the second rotation shaft and the input shaft.

11. The power transmission system of claim 7, wherein the output device comprises:
   the output shaft disposed in parallel with and apart from the torque transmission device;
   an intermediate input gear disposed on a first side portion of the output shaft and engaged with the intermediate output gear; and
   a final output gear disposed on a second side portion of the output shaft.

* * * * *